US012267897B2

(12) United States Patent
Cui et al.

(10) Patent No.: US 12,267,897 B2
(45) Date of Patent: Apr. 1, 2025

(54) TECHNIQUES IN MEASUREMENT GAP CONFIGURATION IN NEW RADIO (NR) RELATED COMMUNICATIONS

(71) Applicant: Apple Inc., Cupertino, CA (US)

(72) Inventors: Jie Cui, Santa Clara, CA (US); Yang Tang, San Jose, CA (US)

(73) Assignee: Apple Inc., Cupertino, CA (US)

(*) Notice: Subject to any disclaimer, the term of this patent is extended or adjusted under 35 U.S.C. 154(b) by 708 days.

(21) Appl. No.: 17/267,365

(22) PCT Filed: Aug. 7, 2019

(86) PCT No.: PCT/US2019/045555
§ 371 (c)(1),
(2) Date: Feb. 9, 2021

(87) PCT Pub. No.: WO2020/033582
PCT Pub. Date: Feb. 13, 2020

(65) Prior Publication Data
US 2021/0227610 A1    Jul. 22, 2021

Related U.S. Application Data

(60) Provisional application No. 62/716,843, filed on Aug. 9, 2018.

(51) Int. Cl.
*H04L 5/00*    (2006.01)
*H04W 24/10*    (2009.01)
(Continued)

(52) U.S. Cl.
CPC .......... *H04W 76/15* (2018.02); *H04W 24/10* (2013.01); *H04W 72/0446* (2013.01);
(Continued)

(58) Field of Classification Search
None
See application file for complete search history.

(56) References Cited

U.S. PATENT DOCUMENTS 9,980,169 B2    5/2018 Gheorghiu et al.
10,609,663 B2 *   3/2020 Vajapeyam ........... H04W 24/10
(Continued)

FOREIGN PATENT DOCUMENTS

CN    102907134 A    1/2013
CN    106162729 A    11/2016
(Continued)

OTHER PUBLICATIONS

Nokia et al., "Interruption time for MG in EN-DC", 3GPP Draft; R4-1803476, 3rd Generation Partnership Project (3GPP), Mobile Competence Centre; 650, Route Des Lucioles; F-06921 Sophia-Antipolis Cedex; France, RAN WG4, Athens, Greece; pp. 20180226-20180302, Mar. 5, 2018.
(Continued)

*Primary Examiner* — Sithu Ko
(74) *Attorney, Agent, or Firm* — Sterne, Kessler, Goldstein & Fox P.L.L.C.

(57) ABSTRACT

Embodiments include methods, apparatuses, storage media, and systems for measurement gap (MG) configuration in an E-UTRA (Evolved Universal Terrestrial Radio Access)-New radio dual connectivity (EN-DC) network, and other new radio (NR) related networks. Various embodiments describe how to configure a measurement gap (MG) based on various conditions in a network, which may include, but are not limited to, different MG types, operating frequencies and modes in the network, timing advancing, and how to determine a starting point of the configured MG to utilize the MG and perform certain measurements adequately.

19 Claims, 8 Drawing Sheets

(51) Int. Cl.

| | | |
|---|---|---|
| *H04W 72/0446* | (2023.01) | |
| *H04W 72/0453* | (2023.01) | |
| *H04W 72/53* | (2023.01) | |
| *H04W 76/15* | (2018.01) | |
| *H04W 76/27* | (2018.01) | |

(52) U.S. Cl.
CPC ....... *H04W 72/0453* (2013.01); *H04W 72/53* (2023.01); *H04W 76/27* (2018.02)

(56) References Cited

U.S. PATENT DOCUMENTS

| | | | | |
|---|---|---|---|---|
| 10,849,150 | B2* | 11/2020 | Dinan | ................... H04L 5/0053 |
| 11,233,619 | B2* | 1/2022 | Kim | ................ H04L 5/001 |
| 2016/0295583 | A1* | 10/2016 | Kazmi | ................. H04W 76/15 |
| 2018/0077596 | A1 | 3/2018 | Huang et al. | |
| 2018/0084448 | A1 | 3/2018 | Yang et al. | |
| 2019/0090151 | A1* | 3/2019 | Yiu | ................... H04W 36/0069 |
| 2019/0246306 | A1* | 8/2019 | Yang | ................ H04L 27/26 |
| 2020/0014523 | A1* | 1/2020 | Huang | ................... H04L 5/001 |
| 2021/0144658 | A1* | 5/2021 | Han | ................. H04W 36/0088 |
| 2021/0160711 | A1* | 5/2021 | Chen | ................... H04W 24/02 |
| 2021/0227413 | A1* | 7/2021 | Yang | ................ H04W 72/0446 |

FOREIGN PATENT DOCUMENTS

| | | |
|---|---|---|
| CN | 106233765 A | 12/2016 |
| CN | 106465315 A | 2/2017 |
| CN | 107637120 A | 1/2018 |
| CN | 108141749 A | 6/2018 |
| EP | 3 860 196 A1 | 8/2021 |
| KR | 10-2018-0004730 A | 5/2017 |
| WO | WO 2018062957 A1 | 4/2018 |
| WO | WO 2018128406 A1 | 7/2018 |
| WO | WO 2020/027615 A1 | 2/2020 |

OTHER PUBLICATIONS

NTT Docomo et al., "[draft] Clarification on measurement gap timing advance", 3GPP Draft; R4-1805510, 3$^{rd}$ Generation Partnership Project (3GPP), Mobile Competence Centre; 650, Route Des Lucioles; F-06921 Sophia-Antipolis Cedex; France; RAN WG4, Melbourne, AU; pp. 20180416-20180420, Apr. 24, 2018.

Intel Corporation, "On starting point to execute the measurement gap", 3GPP Draft; R4-1812138, 3$^{rd}$ Generation Partnership Project (3GPP), Mobile Competence Centre ; 650, Route Des Lucioles ; F-06921 Sophia-Antipolis Cedex, RAN WG4, Chengdu, China; pp. 20181008-20181012, Sep. 28, 2018.

Supplementary European Search Report for Application No. 19846464.6 mailed Sep. 7, 2021, 14 pages.

ZTE Corporation, Sanechips, "Discussion on the configuration of measurement gap", 3GPP TSG-RAN WG2 Meeting #100 (R2-1712602), Reno, USA, Nov. 27-Dec. 1, 2017, 11 pages.

Cao et al., "3GPP Standarization Progress for 5G RAN Architecture", China Unicom Network Technology Research Institute, Beijing, China, 42(1): 07-14 (2018).

Huawei, HiSilicon, "Measurement gap configuration in NR", 3GPP TSG-RAN WG2 #101 (R2-1803761), Athens, Greece, Feb. 26-Mar. 2, 2018, 5 pages.

Huawei, HiSilicon, "Measurement gap configuration in NR", 3GPP TSG-RAN WG2 #101 (R2-1802791), Athens, Greece, Feb. 26-Mar. 2, 2018, 5 pages.

International Search Report and Written Opinion of the International Searching Authority directed to related International Patent Application No. PCT/US2019/045555, mailed Nov. 28, 2019, 13 pages.

CMCC, "Measurement Gap Configuration for Remaining DC Scenarios", R2-1810634, 3GPP TSG-RAN WG2 NR AH1807 Meeting, Montreal, Canada, Jun. 22, 2018.

Intel Corporation, "Measurement gap support in SA", R2-1809759, 3GPP TSG RAN WG2 Meeting #AH, Montreal, Canada, Jun. 22, 2018.

* cited by examiner

TECHNIQUES IN MEASUREMENT GAP CONFIGURATION IN NEW RADIO (NR) RELATED COMMUNICATIONS

CROSS REFERENCE TO RELATED APPLICATION

The present application is a U.S. National Phase of International Application No. PCT/US2019/045555, filed Aug. 7, 2019, which claims priority to U.S. Provisional Patent Application No. 62/716,843, filed Aug. 9, 2018, entitled "Starting Point Definition for Measurement Gap," the entire disclosures of which are hereby incorporated by reference in their entirety.

FIELD

Embodiments of the present invention relate generally to the technical field of wireless communications.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure. Unless otherwise indicated herein, the approaches described in this section are not prior art to the claims in the present disclosure and are not admitted to be prior art by inclusion in this section.

The Fifth Generation (5G) new radio (NR) is implemented in Non-Standalone (NSA) networks that incorporate both long term evolution (LTE) and NR, for example, E-UTRA (Evolved Universal Terrestrial Radio Access)-NR Dual Connectivity (EN-DC) networks, and NR-E-UTRA Dual Connectivity (NE-DC) networks. The 5G NR is further implemented in NR standalone networks, for example, NR single carrier, NR carrier aggregation, NR-NR DC. Both frequency range 1 (FR1) and frequency range 2 (FR2) may be implemented for NR operations. In addition, three types of measurement gaps are defined accordingly. Thus, a conventional LTE measurement gap configuration including configuring a starting point of the configured measurement gap (MG) may not be sufficient and capable while facing an increasingly complex network.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
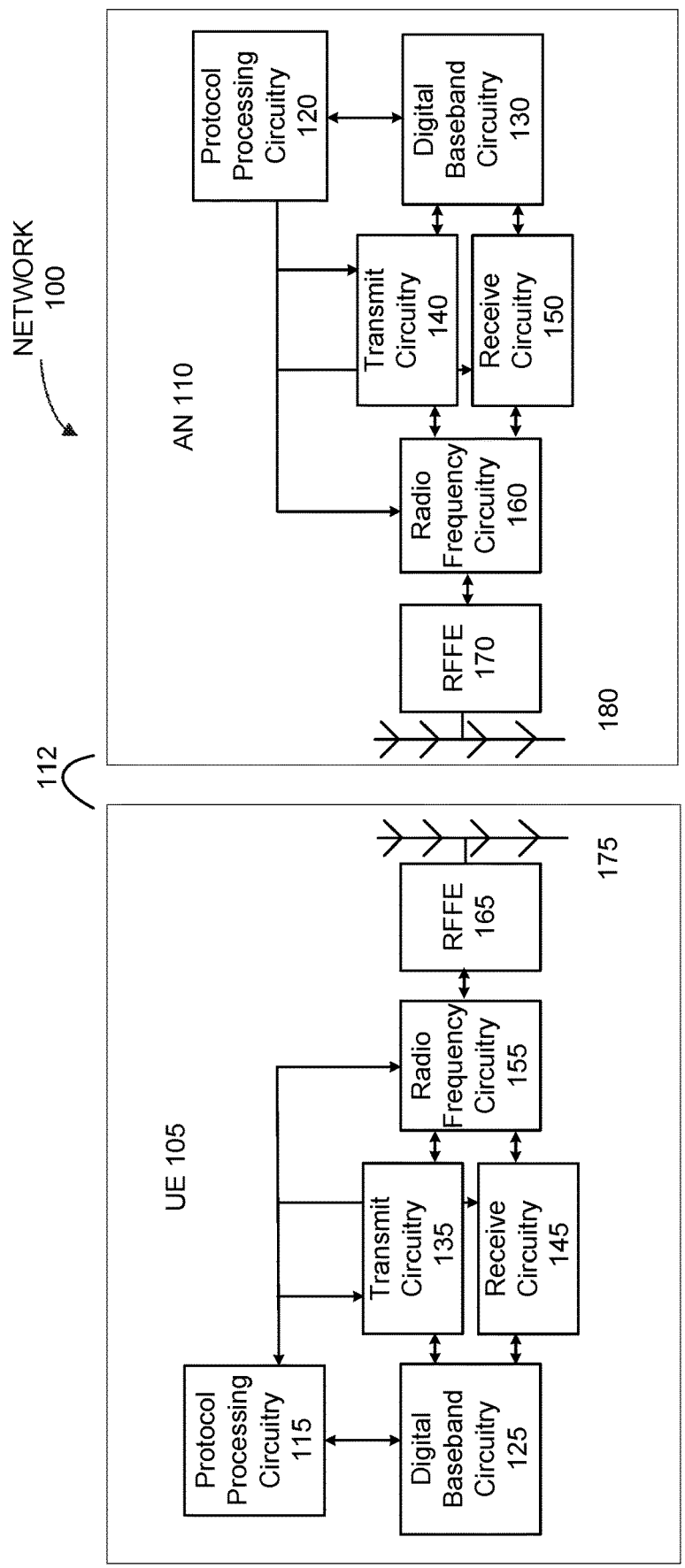
FIG. 1 schematically illustrates an example of a network comprising a user equipment (UE) and an access node (AN) in a wireless network, in accordance with various embodiments.

In the following detailed description, reference is made to the accompanying drawings that form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrases "A or B" and "A and/or B" mean (A), (B), or (A and B). For the purposes of the present disclosure, the phrases "A, B, or C" and "A, B, and/or C" mean (A), (B), (C), (A and B), (A and C), (B and C), or (A, B, and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The terms "coupled," "electronically coupled," "communicatively coupled," "connected," "electronically connected," "communicatively connected," along with derivatives thereof are used herein. The term "coupled" and/or "connected" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" and/or "directly connected" may mean that two or more elements are in direct contact with one another. The term "electronically coupled" and/or "electronically connected" may mean that two or more elements may be in contact with one another by a means of circuitry including through one or more vias, traces, wires, wire-bonds, or other interconnect connections, through a wireless communication channel or link, and/or the like.

As used herein, the term "circuitry" may refer to, be part of, or include any combination of integrated circuits (for example, a field-programmable gate array (FPGA), an application specific integrated circuit (ASIC), etc.), discrete circuits, combinational logic circuits, system on a chip (SOC), system in a package (SiP), that provides the described functionality. In some embodiments, the circuitry may execute one or more software or firmware modules to provide the described functions. In some embodiments, circuitry may include logic, at least partially operable in hardware.

There are various bands below 6 GHz in 4G LTE networks. In NR, frequency range 1 (FR1) overlaps and extends 4G LTE frequencies, including various bands from 450 MHz to 6,000 MHz, which is commonly referred to as NR sub-6 GHz. NR further includes a frequency range 2 (FR2) covering from 24,250 MHz to 52,600 MHz, which is commonly referred to as mmWave, even though the millimeter wave frequency may start at 30 GHz strictly speaking. Herein, the pairs of FR1/FR2 and sub-6 GHz (below 6 GHz)/mmWave are used interchangeably.

Multi-Radio Access Technology (RAT) Dual Connectivity (MR-DC) may involve a multiple reception (Rx)/transmission (Tx) UE that may be configured to utilize radio resources provided by two distinct schedulers in two different nodes connected via non-ideal backhaul, one providing Evolved Universal Terrestrial Radio Access (E-UTRA) access and the other one providing NR access. One scheduler is located in a Master Node (MN) and the other in the Secondary Node (SN). The MN and SN are connected via a network interface and at least the MN is connected to the core network.

MR-DC may include, but is not limited to, E-UTRA-NR Dual Connectivity (EN-DC), NG-RAN-E-UTRA-NR Dual Connectivity (NGEN-DC), and NR-E-UTRA Dual Connectivity (NE-DC). In an EN-DC network or communication, a UE may be connected to one evolved NodeB (eNB) or ng-eNB that acts as an MN and one next generation NodeB (gNB) that acts as an SN. An ng-eNB may be an enhanced eNodeB that connects to the 5G Core network via the next generation (NG) interfaces but still uses LTE air interfaces to communicate with a 5G UE. So, both the basic gNB and ng-eNB use the new NG interfaces toward the 5G Core but use different radio interfaces towards the UE. Note that "eNB" may be used to indicate an eNB and/or ng-eNB, in some embodiments herein. The eNB or ng-eNB is connected to an evolved packet core (EPC) and the gNB is connected to the eNB. The gNB may be a node that provides new radio (NR) user-plane and control-plane protocol terminations towards the UE, and acts as the SN in EN-DC. In an EN-DC network or communication, by contrast, a UE may be connected to one gNB that acts as an MN and one eNB or ng-eNB that acts as an SN. The gNB is connected to 5G Core (5GC) and the eNB or ng-eNB is connected to the gNB via the Xn interface. In some embodiments, an NR standalone (SA) network may include an NR-NR dual connectivity, in which a gNB is connected to a 5GC and no eNB (or other LTE node) is involved in the NR-NR DC communications.

In EN-DC, NE-DC, NR-NR DC, and/or similar communications that involve an MN, a measurement gap configuration may be one of the non-data duties. A measurement gap configuration schedules a gap period repeatedly so that a UE may use the configured period to conduct a non-data duty, for example, cell measurement and/or selection. A UE may use measurement gaps to identify and measure inter-frequency cells, intra-frequency cells, and/or inter-RAT E-UTRAN and/or NR cells. A measurement gap configuration may correspond to one or more measurement gap patterns on which the UE's operations may be based. The operations may include identifying and measuring cells in the network, and other non-data operations. A UE may be configured with a measurement gap while operating at any frequency in either FR1 or FR2. Such a measurement gap configuration may be referred to as a UE gap. A UE measurement gap may also be used when the UE is to do measurements associated with an E-UTRAN (LTE) cell, since the E-UTRAN frequencies are included in or overlapped with the FR1.

In some situations, a UE may be configured with more than one measurement gap according to different frequencies at which the UE may operate. For example, a UE may comply with respective measurement gaps while operating at FR1 and FR2 to accommodate different operations at different frequency ranges. These FR1 measurement gap and FR2 measurement gap are referred to as FR measurement gap in general.

Conventionally in LTE, a measurement gap (MG) starts at the end of the latest subframe occurring immediately before the measurement gap among master cell group (MCG) serving cells subframes. However, in an NR-related communication (e.g., EN-DC, NE-DC, or NR standalone), different starting points may be used and implemented in consideration of various types of measurement gaps, numerologies with multiple subcarrier spacings (SCSs), and/or MG timing advance values. Note that "immediately before" refers to that the one subframe is right next to the other and there is no other subframe in between them. This also applies to frames, slots, symbols, etc.

Embodiments described herein may include, for example, apparatuses, methods, and storage media for configuring and implementing starting point of measurement gaps in, or related to, NR-related networks from perspectives of both UEs and networks. Various embodiments are directed to adequate configurations of MG starting points regarding measurement gap in the NR-related networks. Such configurations may facilitate adequate measurements when utilizing a measurement gap(s).

FIG. 1 schematically illustrates an example wireless network 100 (hereinafter "network 100") in accordance with various embodiments herein. The network 100 may include a UE 105 in wireless communication with an AN 110. The UE 105 may be configured to connect, for example, to be communicatively coupled, with the AN 110. In this example, the connection 112 is illustrated as an air interface to enable communicative coupling, and can be consistent with cellular communications protocols such as a 5G NR protocol operating at mmWave and sub-6 GHz, a Global System for Mobile Communications (GSM) protocol, a code-division multiple access (CDMA) network protocol, a Push-to-Talk (PTT) protocol, and the like.

The UE 105 is illustrated as a smartphone (for example, a handheld touchscreen mobile computing device connectable to one or more cellular networks), but may also comprise any mobile or non-mobile computing devices, such as a Personal Data Assistant (PDA), pager, laptop computer, desktop computer, wireless handset, customer premises equipment (CPE), fixed wireless access (FWA) device, vehicle mounted UE or any computing device including a wireless communications interface. In some embodiments, the UE 105 can comprise an Internet of Things (IoT) UE, which can comprise a network access layer designed for low-power IoT applications utilizing short-lived UE connections. An IoT UE can utilize technologies such as narrowband IoT (NB-IoT), machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An NB-IoT/MTC network describes interconnecting NB-IoT/MTC UEs, which may include uniquely identifiable embedded computing devices (within the Internet infrastructure), with short-lived connections. The NB-IoT/MTC UEs may execute background applications (for example, keep-alive message, status updates, location related services, etc.).

The AN 110 can enable or terminate the connection 112. The AN 110 can be referred to as a base station (BS), NodeB, evolved-NodeB (eNB), next-generation eNB (ng-eNB), next-generation NodeB (gNB or ng-gNB), NG-RAN node, cell, serving cell, neighbor cell, primary cell (PCell), secondary cell (SCell), primary SCell (PSCell), and so forth, and can comprise ground stations (for example, terrestrial access points) or satellite stations providing coverage within a geographic area.

The AN 110 can be the first point of contact for the UE 105. In some embodiments, the AN 110 can fulfill various logical functions including, but not limited to, radio resource control (c), radio network controller (RNC) functions such as radio bearer management, uplink and downlink dynamic radio resource management and data packet scheduling, and mobility management.

In some embodiments, a downlink resource grid can be used for downlink transmissions from the AN 110 to the UE 105, while uplink transmissions can utilize similar techniques. The grid can be a time-frequency grid, called a resource grid or time-frequency resource grid, which is the physical resource in the downlink in each slot. Such a time-frequency plane representation is a common practice for orthogonal frequency division multiplexing (OFDM) systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UE 105. The physical downlink control channel (PDCCH) may carry information about the transport format and resource allocations related to the PDSCH channel, among other things. It may also inform the UE 105 about the transport format, resource allocation, and hybrid automatic repeat request (HARQ) information related to the uplink shared channel. Typically, downlink scheduling (assigning control and shared channel resource blocks to the UE 105 within a cell) may be performed at the AN 110 based on channel quality information fed back from any of the UE 105. The downlink resource assignment information may be sent on the PDCCH used for (for example, assigned to) the UE 105.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition.

Some embodiments may use concepts for resource allocation for control channel information that are an extension of the above-described concepts. For example, some embodiments may utilize an enhanced physical downlink control channel (ePDCCH) that uses PDSCH resources for control information transmission. The ePDCCH may be transmitted using one or more enhanced control channel elements (ECCEs). Similar to the above, each ECCE may correspond to nine sets of four physical resource elements known as enhanced resource element groups (EREGs). An ECCE may have other numbers of EREGs in some situations.

As shown in FIG. 1, the UE 105 may include millimeter wave communication circuitry grouped according to functions. The circuitry shown here is for illustrative purposes and the UE 105 may include other circuitry shown in FIGS. 3A and 3B. The UE 105 may include protocol processing circuitry 115, which may implement one or more layer operations related to medium access control (MAC), radio link control (RLC), packet data convergence protocol (PDCP), radio resource control (RRC) and non-access stratum (NAS). The protocol processing circuitry 115 may include one or more processing cores (not shown) to execute instructions and one or more memory structures (not shown) to store program and data information.

The UE 105 may further include digital baseband circuitry 125, which may implement physical layer (PHY) functions including one or more of HARQ functions, scrambling and/or descrambling, coding and/or decoding, layer mapping and/or de-mapping, modulation symbol mapping, received symbol and/or bit metric determination, multi-antenna port pre-coding and/or decoding, which may include one or more of space-time, space-frequency or spatial coding, reference signal generation and/or detection, preamble sequence generation and/or decoding, synchronization sequence generation and/or detection, control channel signal blind decoding, and other related functions.

The UE 105 may further include transmit circuitry 135, receive circuitry 145, radio frequency (RF) circuitry 155, and RF front end (RFFE) 165, which may include or connect to one or more antenna panels 175.

In some embodiments, RF circuitry 155 may include multiple parallel RF chains or branches for one or more of transmit or receive functions; each chain or branch may be coupled with one antenna panel 175.

In some embodiments, the protocol processing circuitry 115 may include one or more instances of control circuitry (not shown) to provide control functions for the digital baseband circuitry 125 (or simply, "baseband circuitry 125"), transmit circuitry 135, receive circuitry 145, radio frequency circuitry 155, RFFE 165, and one or more antenna panels 175.

Figure 2:
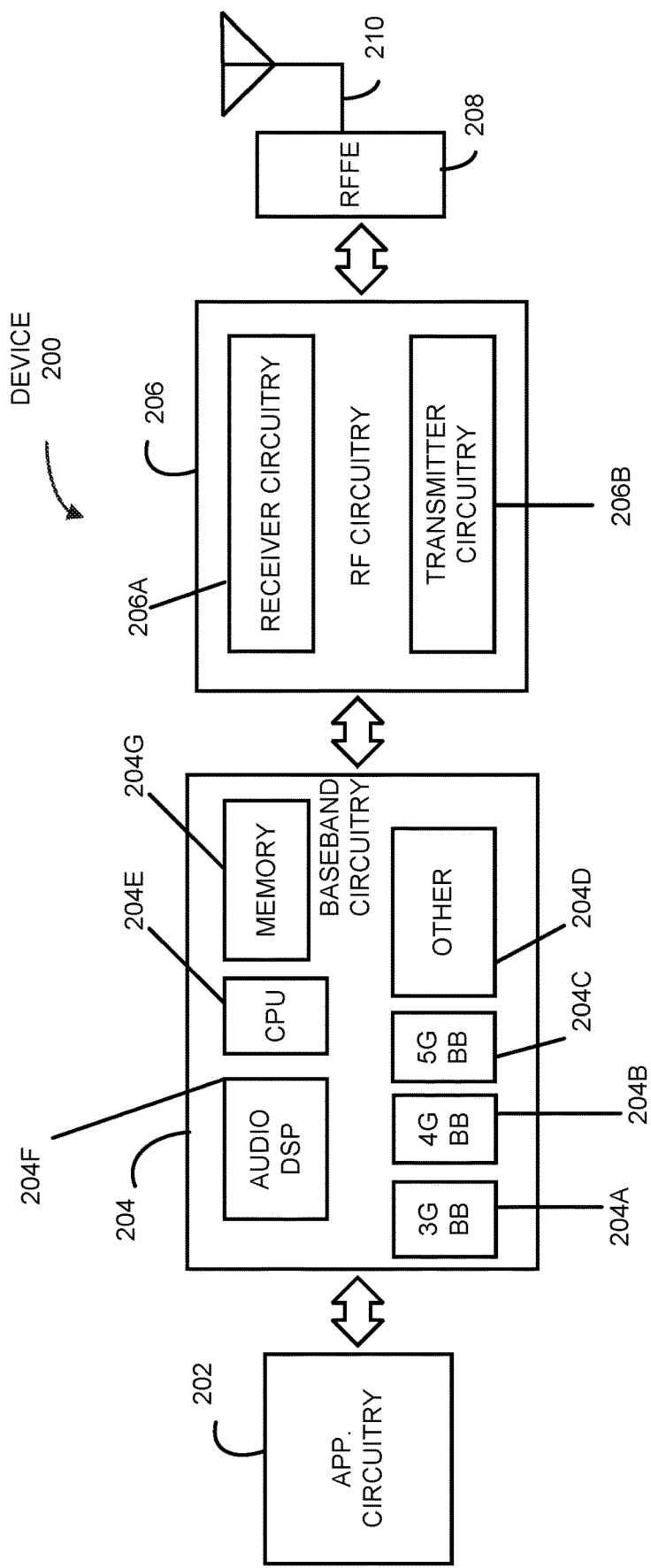
FIG. 2 illustrates example components of a device in accordance with various embodiments.

A UE reception may be established by and via the one or more antenna panels 175, RFFE 165, RF circuitry 155, receive circuitry 145, digital baseband circuitry 125, and protocol processing circuitry 115. The one or more antenna panels 175 may receive a transmission from the AN 110 by receive-beamforming signals received by a plurality of antennas/antenna elements of the one or more antenna panels 175. Further details regarding the UE 105 architecture are illustrated in FIGS. 2, 3A/3B, and 6. The transmission from the AN 110 may be transmit-beamformed by antennas of the AN 110. In some embodiments, the baseband circuitry 125 may contain both the transmit circuitry 135 and the receive circuitry 145. In other embodiments, the baseband circuitry 125 may be implemented in separate chips or modules, for example, one chip including the transmit circuitry 135 and another chip including the receive circuitry 145.

Similar to the UE 105, the AN 110 may include mmWave/sub-mmWave communication circuitry grouped according to functions. The AN 110 may include protocol processing circuitry 120, digital baseband circuitry 130 (or simply, "baseband circuitry 130"), transmit circuitry 140, receive circuitry 150, RF circuitry 160, RFFE 170, and one or more antenna panels 180.

A cell transmission may be established by and via the protocol processing circuitry 120, digital baseband circuitry 130, transmit circuitry 140, RF circuitry 160, RFFE 170, and one or more antenna panels 180. The one or more antenna panels 180 may transmit a signal by forming a transmit beam. FIG. 3 further illustrates details regarding the RFFE 170 and antenna panel 180.

The AN 110 may generate and transmit a message to include a measurement gap configuration according to various embodiments herein. The UE 105 may decode the message transmitted by the AN 100 to determine a starting point of the configured measurement gap, according to various embodiments herein.

FIG. 2 illustrates example components of a device 200 in accordance with some embodiments. In contrast to FIG. 1, FIG. 2 illustrates example components of the UE 105 or the AN 110 from a receiving and/or transmitting function point of view, and it may not include all of the components described in FIG. 1. In some embodiments, the device 200 may include application circuitry 202, baseband circuitry 204, RF circuitry 206, RFFE circuitry 208, and a plurality of antennas 210 together at least as shown. The baseband circuitry 204 may be similar to and substantially interchangeable with the baseband circuitry 125 in some embodiments. The plurality of antennas 210 may constitute one or more antenna panels for beamforming. The components of the illustrated device 200 may be included in a UE or an AN. In some embodiments, the device 200 may include fewer elements (for example, a cell may not utilize the application circuitry 202, and instead include a processor/controller to process IP data received from an EPC). In some embodiments, the device 200 may include additional elements such as, for example, a memory/storage, display, camera, sensor, or input/output (I/O) interface. In other embodiments, the components described below may be included in more than one device (for example, said circuitry may be separately included in more than one device for Cloud-RAN (C-RAN) implementations).

The application circuitry 202 may include one or more application processors. For example, the application circuitry 202 may include circuitry such as, but not limited to, one or more single-core or multi-core processors. The processor(s) may include any combination of general-purpose processors and dedicated processors (for example, graphics processors, application processors, etc.). The processors may be coupled with or may include memory/storage and may be configured to execute instructions stored in the memory/storage to enable various applications or operating systems to run on the device 200. In some embodiments, processors of application circuitry 202 may process IP data packets received from an EPC.

The baseband circuitry 204 may include circuitry such as, but not limited to, one or more single-core or multi-core processors. The baseband circuitry 204 may be similar to and substantially interchangeable with the baseband circuitry 125 and the baseband circuitry 130 in some embodiments. The baseband circuitry 204 may include one or more baseband processors or control logic to process baseband signals received from a receive signal path of the RF circuitry 206 and to generate baseband signals for a transmit signal path of the RF circuitry 206. Baseband circuitry 204 may interface with the application circuitry 202 for generation and processing of the baseband signals and for controlling operations of the RF circuitry 206. For example, in some embodiments, the baseband circuitry 204 may include a third generation (3G) baseband processor 204A, a fourth generation (4G) baseband processor 204B, a fifth generation (5G) and/or NR baseband processor 204C, or other baseband processor(s) 204D for other existing generations, generations in development or to be developed in the future (for example, second generation (2G), sixth generation (6G), etc.). The baseband circuitry 204 (for example, one or more of baseband processors 204A-D) may handle various radio control functions that enable communication with one or more radio networks via the RF circuitry 206. In other embodiments, some or all of the functionality of baseband processors 204A-D may be included in modules stored in the memory 204G and executed via a central processing unit (CPU) 204E. The radio control functions may include, but are not limited to, signal modulation/demodulation, encoding/decoding, radio frequency shifting, etc. In some embodiments, modulation/demodulation circuitry of the baseband circuitry 204 may include Fast-Fourier Transform (FFT), precoding, or constellation mapping/demapping functionality. In some embodiments, encoding/decoding circuitry of the baseband circuitry 204 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 204 may include one or more audio digital signal processor(s) (DSP) 204F. The audio DSP(s) 204F may include elements for compression/decompression and echo cancellation and may include other suitable processing elements in other embodiments. Components of the baseband circuitry may be suitably combined in a single chip, in a single chipset, or disposed on a same circuit board in some embodiments. In some embodiments, some or all of the constituent components of the baseband circuitry 204 and the application circuitry 202 may be implemented together such as, for example, on a SOC.

In some embodiments, the baseband circuitry 204 may provide for communication compatible with one or more radio technologies. For example, in some embodiments, the baseband circuitry 204 may support communication with an evolved universal terrestrial radio access network (E-UTRAN) or other wireless metropolitan area networks (WMAN), a wireless local area network (WLAN), a wireless personal area network (WPAN). Embodiments in which the baseband circuitry 204 is configured to support radio communications of more than one wireless protocol may be referred to as multi-mode baseband circuitry.

RF circuitry 206 may enable communication with wireless networks using modulated electromagnetic radiation through a non-solid medium. In various embodiments, the RF circuitry 206 may include one or more switches, filters, amplifiers, etc. to facilitate the communication with the wireless network. RF circuitry 206 may include receiver circuitry 206A, which may include circuitry to down-convert RF signals received from the RFFE circuitry 208 and provide baseband signals to the baseband circuitry 204. RF circuitry 206 may also include transmitter circuitry 206B, which may include circuitry to up-convert baseband signals provided by the baseband circuitry 204 and provide RF output signals to the RFFE circuitry 208 for transmission.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 206 may include analog-to-digital converter (ADC) and digital-to-analog converter (DAC) circuitry and the baseband circuitry 204 may include a digital baseband interface to communicate with the RF circuitry 206.

In some dual-mode embodiments, a separate radio integrated circuit (IC) circuitry may be provided for processing signals for each spectrum, although the scope of the embodiments is not limited in this respect.

RFFE circuitry 208 may include a receive signal path, which may include circuitry configured to operate on RF beams received from one or more antennas 210. The RF beams may be transmit beams formed and transmitted by the AN 110 while operating in mmWave or sub-mmWave frequency rang. The RFFE circuitry 208 coupled with the one or more antennas 210 may receive the transmit beams and proceed them to the RF circuitry 206 for further processing. RFFE circuitry 208 may also include a transmit signal path, which may include circuitry configured to amplify signals for transmission provided by the RF circuitry 206 for transmission by one or more of the antennas 210, with or without beamforming. In various embodiments, the amplification through transmit or receive signal paths may be done solely in the RF circuitry 206, solely in the RFFE circuitry 208, or in both the RF circuitry 206 and the RFFE circuitry 208.

In some embodiments, the RFFE circuitry 208 may include a TX/RX switch to switch between transmit mode and receive mode operation. The RFFE circuitry 208 may include a receive signal path and a transmit signal path. The receive signal path of the RFFE circuitry 208 may include a low noise amplifier (LNA) to amplify received RF beams and provide the amplified received RF signals as an output (for example, to the RF circuitry 206). The transmit signal path of the RFFE circuitry 208 may include a power amplifier (PA) to amplify input RF signals (for example, provided by RF circuitry 206), and one or more filters to generate RF signals for beamforming and subsequent transmission (for example, by one or more of the one or more antennas 210).

Processors of the application circuitry 202 and processors of the baseband circuitry 204 may be used to execute elements of one or more instances of a protocol stack. For example, processors of the baseband circuitry 204, alone or in combination, may be used to execute Layer 3, Layer 2, or Layer 1 functionality, while processors of the application circuitry 202 may utilize data (for example, packet data) received from these layers and further execute Layer 4 functionality (for example, transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/AN, described in further detail below.

FIG. 3A illustrates an embodiment of a radio frequency front end 300 incorporating an mmWave RFFE 305 and one or more sub-6 GHz radio frequency integrated circuits (RFICs) 310. The mmWave RFFE 305 may be similar to and substantially interchangeable with the RFFE 165, RFFE 170, and/or the RFFE circuitry 208 in some embodiments. The mmWave RFFE 305 may be used for the UE 105 while operating in FR2 or mmWave; the RFICs 310 may be used for the UE 105 while operating in FR1, sub-6 GHz, or LTE bands. In this embodiment, the one or more RFICs 310 may be physically separated from the mmWave RFFE 305. RFICs 310 may include connection to one or more antennas 320. The RFFE 305 may be coupled with multiple antennas 315, which may constitute one or more antenna panels.

Figure 3B:
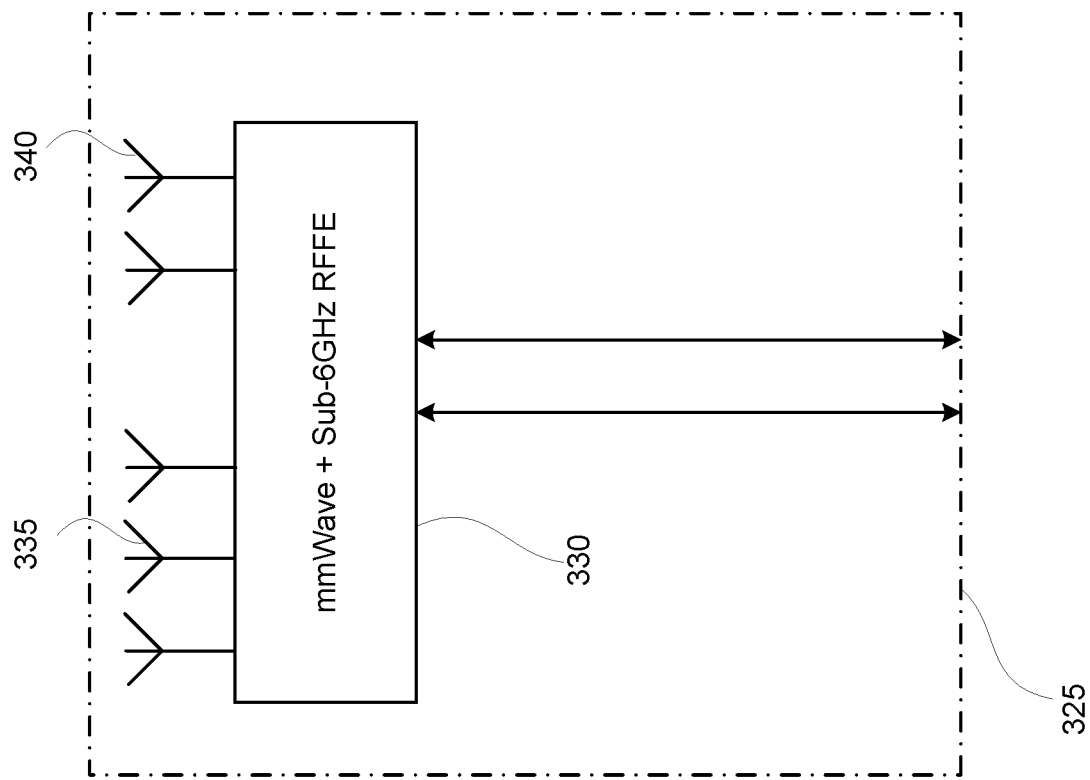
FIG. 3B illustrates an alternative RFFE in accordance with some embodiments.
Figure 3A:
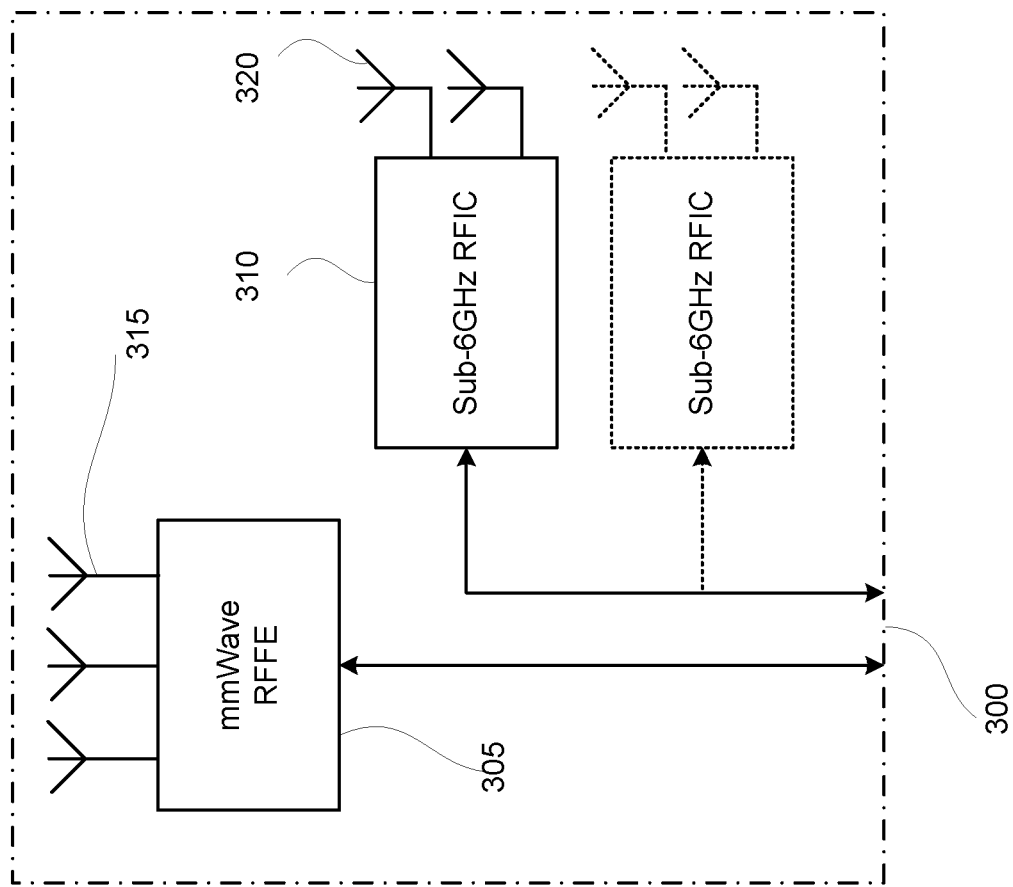
FIG. 3A illustrates an example radio frequency front end (RFFE) incorporating a millimeter Wave (mmWave) RFFE and one or more sub-millimeter wave radio frequency integrated circuits (RFICs) in accordance with some embodiments.

FIG. 3B illustrates an alternate embodiment of an RFFE 325. In this aspect both millimeter wave and sub-6 GHz radio functions may be implemented in the same physical RFFE 330. The RFFE 330 may incorporate both millimeter wave antennas 335 and sub-6 GHz antennas 340. The RFFE 330 may be similar to and substantially interchangeable with the RFFE 165, RFFE 170, and/or the RFFE circuitry 208 in some embodiments.

FIGS. 3A and 3B illustrate embodiments of various RFFE architectures for either the UE 105 or the AN 110.

Multi-Cell Measurement

Figure 4A:
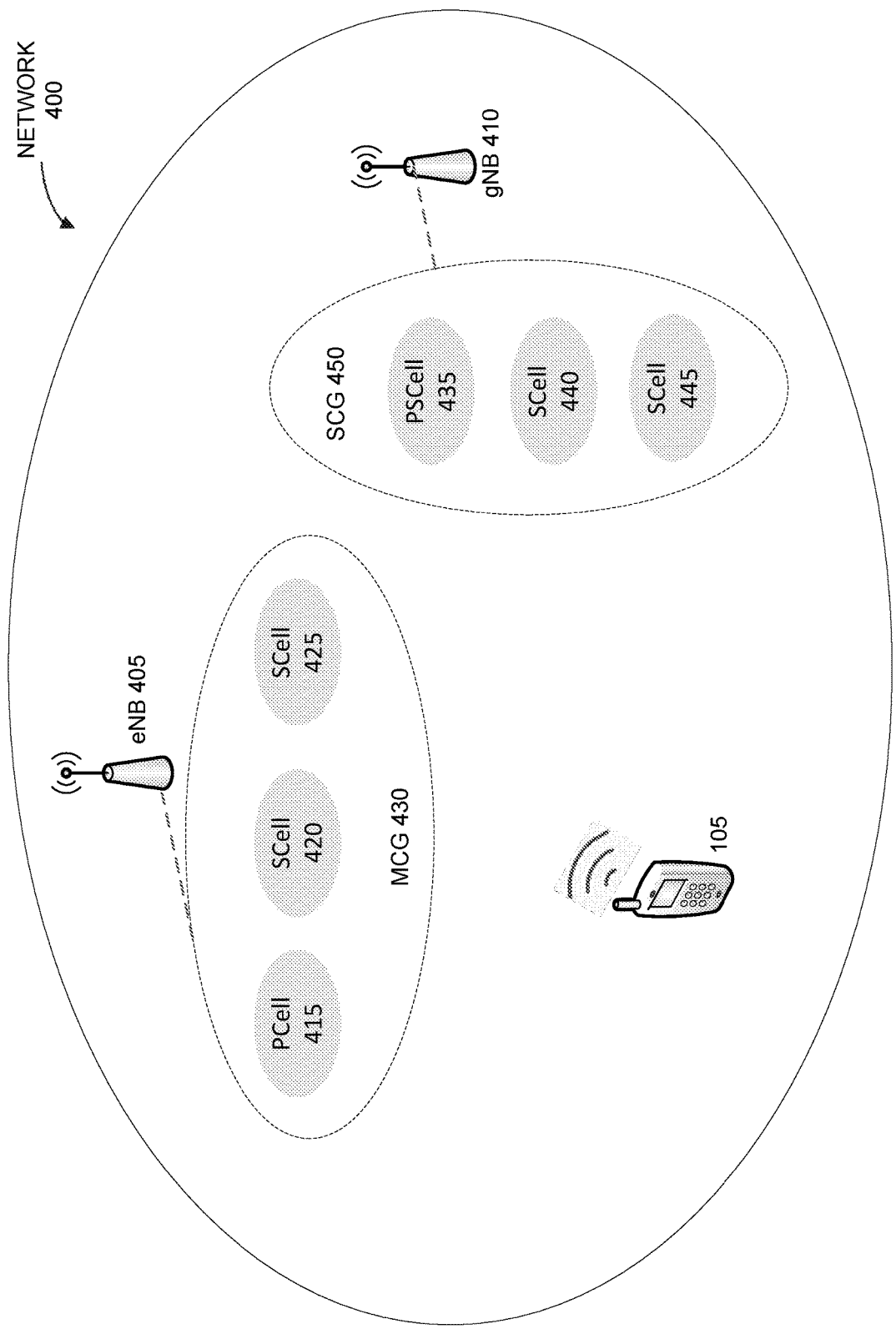
FIGS. 4A and 4B illustrate respective example measurement gap (MG) configuration and operation in an EN-DC network and an NR-NR DC network, according to various embodiments.

FIG. 4A illustrates an example network 400 that involves 5G NR communications, according to various embodiments. The network 400 may be an EN-DC network. The network 400 may include multiple ANs and/or NodeBs, for example, eNB 405 and gNB 410. The eNB 405 and gNB 410 may be the same or substantially similar to the AN 110 in FIG. 1. The eNB 405 may provide or be associated with a Primary Serving Cell (PCell) 415 of the UE 105. The eNB 405 may further provide or be associated with one or more Secondary Cells (SCells), for example, 420 and 425. The PCell 415 and SCells 420/425 may be part of a Master Cell Group (MCG) 430 of the UE 105.

In some embodiments, the gNB 410 may provide or be associated with a Primary Secondary Serving Cell (PSCell) 435 of the UE 105. The gNB 410 may further provide one or more SCells, e.g., 440 and 445. The PSCell 435 and SCells 440/445 may be part of a Secondary Cell Group (SCG) 450 of the UE 105.

Note that "AN of the PCell," "AN in the PCell," and "PCell" are used interchangeably throughout the disclosure herein, as well as regarding the terms of PSCell, SCell, etc.

In a network that operates in an EN-DC mode to the UE 105, the UE 105 may receive LTE signals, also known as E-UTRA (Evolved Universal Terrestrial Radio Access) signals, from the eNB 405. The LTE signals may include a plurality of LTE frames, which further include a plurality of LTE subframes. Those LTE subframes may be referred to as MCG serving cell(s) subframes, or LTE subframes of MCG serving cell(s). The cells 415/420/425 may be referred to as LTE serving cells. Meanwhile, the UE 105 may receive NR signals from the gNB 410. The NR signals may include a plurality of NR frames, which may further include a plurality of NR subframes. Those NR subframes may be referred to as SCG serving cell(s) subframes, or NR subframes of SCG severing cell(s). The cells 435/440/445 may be referred to as NR serving cells. In addition, an NR subframe may include a plurality of NR slots. In some embodiments, the NR slots may be used in indicating the MG start. Note that an NR subframe may always be 1 millisecond (ms), and an NR slot may be 1 ms or have different lengths in a time domain due to various subcarrier spacings (SCSs).

In embodiments, the UE 105 may be configured with a measurement gap (MG) so that the UE 105 may perform certain tasks commanded by the eNB 405. The MG may be a per-UE MG for all frequencies or a per-FR MG that may be used only for certain frequencies. The per-FR MG may include a per-FR for an FR1 frequency or a per-FR for an FR2 frequency. The MG may include a plurality of gap patterns that can be configured to the UE 105.

In embodiments, an MG configuration may indicate a starting point of the MG to be configured to the UE 105. In the EN-DC operation, the MCG may include all the LTE subframes and the SCG may include all the NR subframes. In some embodiments, if the MG is configured with a per-UE MG, the MG configuration may indicate a start of the MG based on the MCG serving cell subframes, which means LTE subframes of the MCG 430 in the EN-DC operations. The UE may receive more than one LTE subframe from more than one MCG serving cells, e.g., cells 415, 420, and/or 425. The UE 105 may determine the MG start based on all the LTE subframes of the MCG serving cells, upon reception of those subframes. The UE 105 may receive the LTE subframes at different time points, due to various delays and signal paths in the network. The UE 105 may determine or select the latest received subframe, which may be the subframe received the last by the UE 105 in time. The MG may start at the end of the latest subframe occurring immediately before the configured MG among all MCG serving cell(s) subframes. For example, if the MG configuration configures the MG to start from Subframe 1 in a frame including Subframes 0-9, the MG may start at the end of Subframe 0, since Subframe 0 is the subframe occurring immediately before Subframe 1. In addition, the Subframes 0 and/or 1 may be the subframes received by the UE 105 latest among all MCG serving cell subframes received by the UE 105. Further, the MG configuration may configure a timing advance T=x ms, to indicate the MG may start at time T=x ms advanced to the end of the latest LTE subframe occurring immediately before the MG among the MCG serving cell(s) subframes. X may be a value equal to or greater than zero. For example, x may be equal to 0.5.

In embodiments, if the MG is configured with a per-FR MG, the MG configuration may indicate a start of the MG based on the MCG serving cell subframes or SCG serving cell subframes, depending on whether FR1 or FR2 is configured. If the per-FR MG is for FR1, the LTE subframes of the MCG 430 may be used in determining the latest subframe. Similar to the scenario of per-UE MG configuration, the UE may receive more than one LTE subframe from more than one MCG serving cells, e.g., cells 415, 420, and/or 425. The UE 105 may determine the MG start based on all the LTE subframes of the MCG serving cells, upon reception of those subframes. The UE 105 may receive the LTE subframes at different time points, due to various delays and signal paths in the network. The UE 105 may determine or select the latest received subframe, which may be the subframe received the last by the UE 105 in time. The MG may start at the end of the latest subframe occurring immediately before the configured MG among all MCG serving cell(s) subframes. Further, the MG configuration may configure a timing advance T=x ms, to indicate the MG may start at time T=x ms advanced to the end of the latest LTE subframe occurring immediately before the MG among the MCG serving cell(s) subframes.

In embodiments, if the per-FR MG is for FR2, the NR subframes of the SCG 450 at FR2 frequencies may be used in determining the latest subframe. In this scenario, the UE may receive more than one NR subframe from more than one SCG serving cells, e.g., cells 435, 440, and/or 445 at FR2 and/or FR1 frequencies. The UE 105 may determine the MG start based on all the NR FR2 subframes of the SCG serving cells, upon reception of those subframes. The UE 105 may receive the NR FR2 subframes at different time points, due to various delays and signal paths in the network. The UE 105 may determine or select the latest received FR2 subframe, which may be the subframe received the last by the UE 105 in time. The MG may start at the end of the latest NR subframe occurring immediately before the configured MG among all SCG serving cell(s) subframes in the FR2 frequency range. Further, the MG configuration may configure a timing advance T=x ms, to indicate that the MG may start at time T=x ms advanced to the end of the latest NR subframe occurring immediately before the MG among the SCG serving cell(s) subframes in the FR2.

Additionally or alternatively, if the per-FR MG is for FR2, the NR slots occurring immediately before the subframe of the configured MG at FR2 frequencies may be used in determining the starting point of the MG. In this scenario, the UE may receive more than one NR slot from more than one SCG serving cells, e.g., cells 435, 440, and/or 445, at FR2 and/or FR1 frequencies. The UE 105 may determine the MG start based on all the NR FR2 slots of the SCG serving cells, upon reception of those slots. The UE 105 may receive the NR FR2 slots at different time points, due to various delays and signal paths in the network. The UE 105 may determine or select the latest received FR2 slot that is immediately before the subframe of the configured MG. Such an NR slot may be the slot received the last by the UE 105 in time among all the received NR FR2 slots that are immediately before their corresponding subframes of the configured MG. The MG may start at the end of the latest NR slot occurring immediately before the configured MG among all SCG serving cell(s) slots in the FR2. Since an MG may have to start at the beginning of a subframe, the MG starting point determination may result in the same starting point based on either NR slots or NR subframes. Thus, NR slots or NR subframes may be used in determining the starting point of the MG, and reach the same results. For example, if an SCS=120 kHz, one subframe may include 8 slots. If NR slots are used in determining the MG starting point, only the last NR slot of a subframe may be used, as it is the slot occurring immediately before a configured MG. This is because an MG may only start at the beginning of a subframe.

Figure 4B:
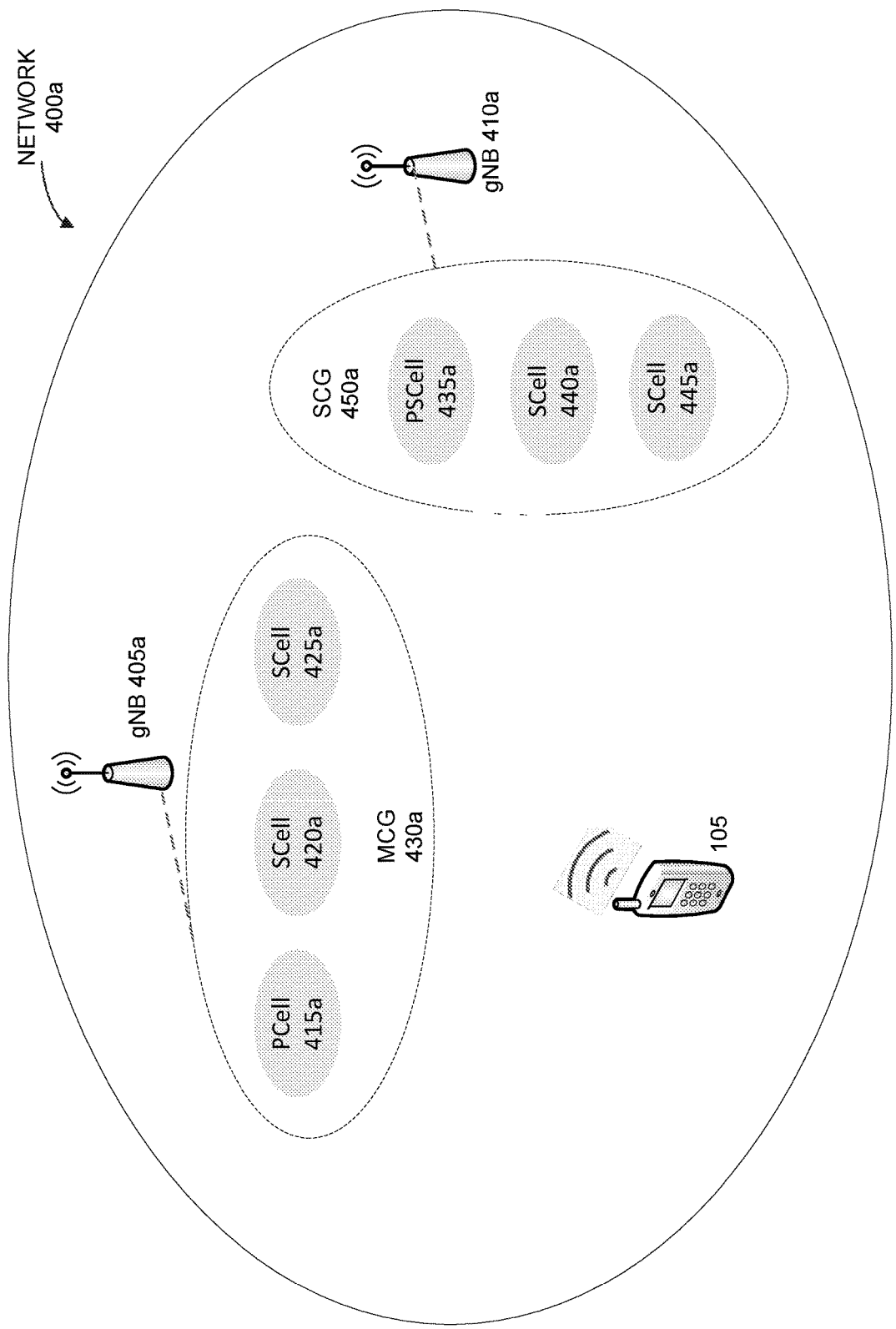

FIG. 4b schematically illustrates an NR standalone network 400a, according to various embodiments. The NR standalone network 400a may include, but is not limited to, a single carrier NR operation, an NR carrier aggregation (CA) operation, and NR-NR dual-connectivity (DC). In an NR-NR DC operation, the gNB 405a and 410a may be the two NR nodes according to various embodiments. In accordance, the cells 415a/420a/425a and 435a/440a/445a may be NR cells. The cells 415a/420a/425a may be part of an MCG 430*a*, and the cells 435*a*/440*a*/445*a* may be part of an SCG 450*a*. The MCG 430*a* and SCG 450*a* may respectively operate in FR1 alone, FR2 alone, or FR1 and FR2 simultaneously.

In embodiments of the NR standalone operation, if the MG is configured with a per-UE MG, the MG configuration may indicate a start of the MG based on the MCG serving cell subframes/slots, for all frequencies. The UE may receive more than one NR subframe/slot from more than one MCG serving cells, e.g., cells 415*a*, 420*a*, and/or 425*a*. The UE 105 may determine the MG start based on all the NR subframes/slots of the MCG serving cells, upon reception of those subframes/slots. The UE 105 may receive the NR subframes/slots at different time points, due to various delays and signal paths in the network. The UE 105 may determine or select the latest received subframe/slot, which may be the subframe/slot received the last by the UE 105 in time. The MG may start at the end of the latest subframe/slot occurring immediately before the configured MG among all MCG serving cell(s) subframes/slots. Further, the MG configuration may configure a timing advance T=x ms, to indicate the MG may start at time T=x ms advanced to the end of the latest NR subframe/slot occurring immediately before the MG among the MCG serving cell(s) subframes/slots. x may be a value equal to or greater than zero. For example, x may be equal to 0.5.

In embodiments of the NR standalone operation in an NR-NR DC, if the MG is configured with a per-FR MG, the MG configuration may indicate a start of the MG based on the MCG serving cell subframes/slots or SCG serving cell subframes/slots. If the per-FR MG is for FR1, the NR FR1 subframes/slots of the MCG 430*a* may be used in determining the latest subframe/slot while there is at least one master serving cell operating in FR1. The UE may receive more than one NR FR1 subframe/slot from more than one MCG serving cells, e.g., cells 415*a*, 420*a*, and/or 425*a*. The UE 105 may determine that the MG starts based on all the NR FR1 subframes/slots of the MCG serving cells, upon reception of those subframes/slots. The UE 105 may receive the NR FR1 subframes/slots at different time points, due to various delays and signal paths in the network. The UE 105 may determine or select the latest received subframe/slot, which may be the subframe/slot received the last by the UE 105 in time. The MG may start at the end of the latest subframe/slot occurring immediately before the configured MG among all MCG serving cell(s) subframes/slots in FR1 while at least one master serving cell is in FR1. Further, the MG configuration may configure a timing advance T=x ms, to indicate the MG may start at time T=x ms advanced to the end of the latest NR subframe/slot occurring immediately before the MG among the MCG serving cell(s) subframes/slots in FR1. Note that in certain NR-NR-DC mode, at least one master cell may have to be operating in FR1. Therefore, the per-FR MG for FR1 may start at the end of the latest NR subframe/slot occurring immediately before the MG among all MCG serving cell(s) subframes/slots in FR1.

In embodiments, if the per-FR MG is for FR1, the NR FR1 subframes/slots of the SCG 450*a* may be used in determining the latest subframe/slot while all the master serving cells are operating in FR2. The UE may receive more than one NR FR1 subframe/slot from more than one SCG serving cells, e.g., cells 435*a*, 440*a*, and/or 445*a*. The UE 105 may determine that the MG starts based on all the NR FR1 subframes/slots of the SCG serving cells, upon reception of those subframes/slots. The UE 105 may receive the NR FR1 subframes/slots at different time points, due to various delays and signal paths in the network. The UE 105 may determine or select the latest received subframe/slot, which may be the subframe/slot received the last by the UE 105 in time. The MG may start at the end of the latest subframe/slot occurring immediately before the configured MG among all SCG serving cell(s) subframes/slots in FR1 while at least one master serving cell is in FR1. Further, the MG configuration may configure a timing advance T=x ms, to indicate the MG may start at time T=x ms advanced to the end of the latest NR subframe/slot occurring immediately before the MG among the SCG serving cell(s) subframes/slots in FR1.

In embodiments, if the per-FR MG is for FR2, the NR subframes/slots of the SCG 450*a* at FR2 frequencies may be used in determining the latest subframe/slot. In this scenario, all the master cells may be operating in FR1, and at least one secondary cell is operating in FR2. The UE may receive more than one NR subframe/slot from more than one SCG serving cell, e.g., cells 435*a*, 440*a*, and/or 445*a* at FR2 and/or FR1 frequencies. The UE 105 may determine that the MG starts based on all the NR FR2 subframes/slots of the SCG serving cells, upon reception of those subframes/slots. The UE 105 may receive the NR FR2 subframes/slots at different time points, due to various delays and signal paths in the network. The UE 105 may determine or select the latest received FR2 subframe/slot, which may be the subframe/slot received the last by the UE 105 in time. The MG may start at the end of the latest NR subframe/slot occurring immediately before the configured MG among all SCG serving cell(s) subframes/slots in the FR2 frequency range. Further, the MG configuration may configure a timing advance T=x ms, to indicate that the MG may start at time T=x ms advanced to the end of the latest NR subframe/slot occurring immediately before the MG among the SCG serving cell(s) subframes/slots in the FR2.

Figure 5B:
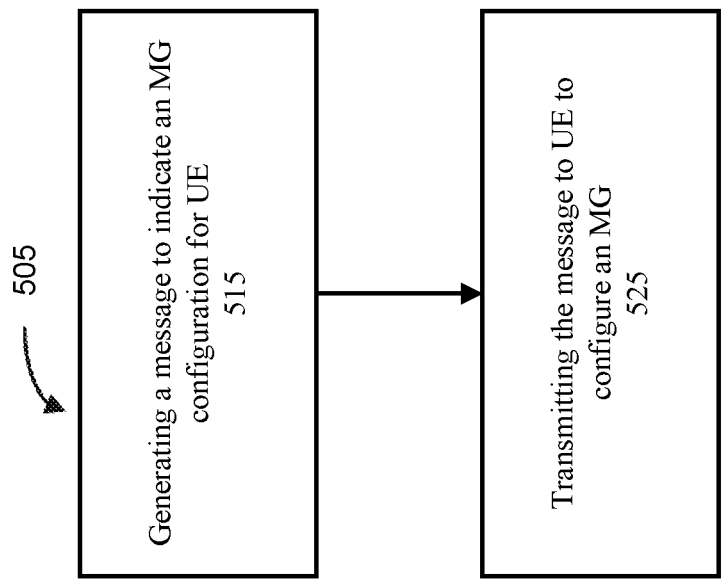
FIG. 5B illustrates an operation flow/algorithmic structure to facilitate the process of MG configuration and operation by an AN in accordance with various embodiments.
Figure 5A:
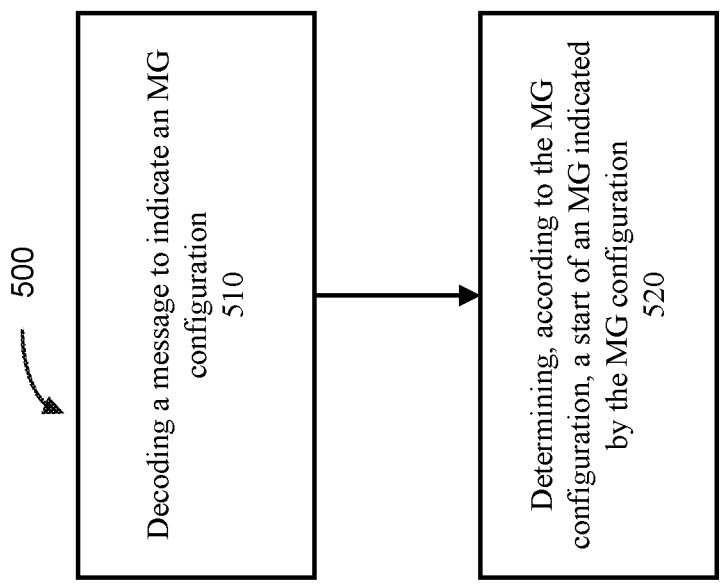
FIG. 5A illustrates an operation flow/algorithmic structure to facilitate a process of MG configuration and operation by a UE in accordance with various embodiments.

FIG. 5A illustrates an operation flow/algorithmic structure 500 to facilitate a process of MG configuration and operation by the UE 105, in accordance with various embodiments as illustrated with respect to FIGS. 4A and 4B. The operation flow/algorithmic structure 500 may be performed by the UE 105 or circuitry thereof.

The operation flow/algorithmic structure 500 may include, at 510, decoding a message to obtain an MG configuration. The UE may decode the message that includes an indication of the MG configuration upon reception of a corresponding signal transmitted by an eNB in the EN-DC mode, or a gNB in an NR-related mode, such as an NR single carrier operation, NE-DC mode, NR-NR-DC mode, etc. Such a signal transmission/reception may be via an RRC signaling in an RRC-connected state. The MG configuration may include configuring a starting point of a configured MG. For example, the MG configuration may indicate that the configured MG starts at x milliseconds advanced to an end of a latest subframe/slot occurring immediately before the configured MG among at least one subframe/slot of either a set of MCG serving cell or a set of SCG serving cells, according to various scenarios and embodiments described with respect to FIGS. 4A and 4B.

The operation flow/algorithmic structure 500 may include, at 520, determining, according to the MG configuration, a start of an MG indicated by the MG configuration. The determination may be based on several conditions or factors, including but not limited to MG types (per-UE, per-FR for FR1, and per-FR for FR2), operating frequencies (FR1 or FR2) at MCG and SCG serving cells, timing advance, types of SCS. The UE 105 may determine the latest subframe or slot occurring immediately before the configured MG based on respective receiving times at the UE. More details in this regard are described with respect to FIGS. 4A and 4B.

FIG. 5B illustrates an operation flow/algorithmic structure 505 to facilitate the process of MG configuration and operation by the AN 405, in accordance with various embodiments as illustrated with respect to FIGS. 4A and 4B. The AN 405 may be an eNB in the EN-DC mode and the AN 405a in the NR CA mode, NR-NR mode, or other NR standalone mode. The operation flow/algorithmic structure 505 may be performed by the AN 110 or circuitry thereof.

The operation flow/algorithmic structure 505 may include, at 515, generating a message to indicate an MG configuration for the UE 105. The MG configuration may be the same as or substantially similar to the MG described at 510. The MG configuration may be based on several conditions or factors, including but not limited to MG types (per-UE, per-FR for FR1, and per-FR for FR2), operating frequencies (FR1 or FR2) at MCG and SCG serving cells, timing advance value, types of SCS. In some embodiments, the MG configuration may be generated in an information element (IE) of an RRC.

The operation flow/algorithmic structure 505 may further include, at 525, transmitting the message to the UE 105 to configure an MG for the UE 105. While the MG configuration is generated in an RRC IE, the transmission of the message may be via an RRC signaling in an RRC-connected state. The eNB or gNB may further indicate various tasks for the UE 105 to perform during the configured MG.

Figure 6:
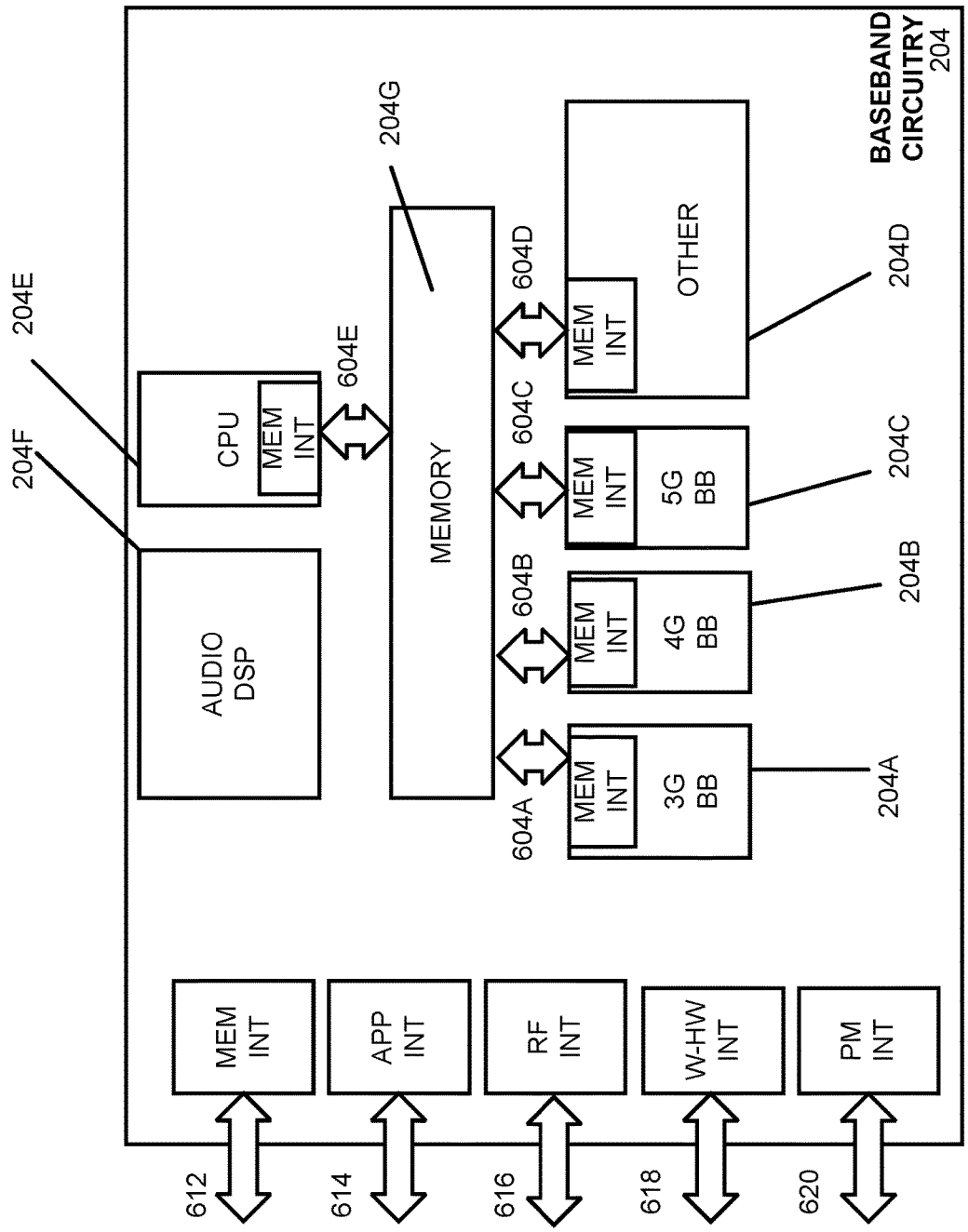
FIG. 6 illustrates example interfaces of baseband circuitry in accordance with various embodiments.

FIG. 6 illustrates example interfaces of baseband circuitry in accordance with some embodiments. As discussed above, the baseband circuitry 204 of FIG. 2 may comprise processors 204A-204E and a memory 204G utilized by said processors. The processors 204A-204E of the UE 105 may perform some or all of the operation flow/algorithmic structure 500, in accordance with various embodiments with respect to the networks 400 and 405. The processors 204A-204E of the AN 110 may perform some or all of the operation flow/algorithmic structure 505, in accordance with various embodiments with respect to the networks 400 and 405. Each of the processors 204A-204E may include a memory interface, 604A-604E, respectively, to send/receive data to/from the memory 204G. The processors 204A-204E of the UE 105 may be used to process the SFTD measurement; the processors 204A-204E of the AN 110 may be used to generate the SFTD measurement configuration.

The baseband circuitry 204 may further include one or more interfaces to communicatively couple to other circuitries/devices, such as a memory interface 612 (e.g., an interface to send/receive data to/from memory external to the baseband circuitry 204), an application circuitry interface 614 (for example, an interface to send/receive data to/from the application circuitry 202 of FIG. 2), an RF circuitry interface 616 (for example, an interface to send/receive data to/from RF circuitry 206 of FIG. 2), a wireless hardware connectivity interface 618 (for example, an interface to send/receive data to/from Near Field Communication (NFC) components, Bluetooth® components (for example, Bluetooth® Low Energy), Wi-Fi® components, and other communication components), and a power management interface 620 (for example, an interface to send/receive power or control signals).

Figure 7:
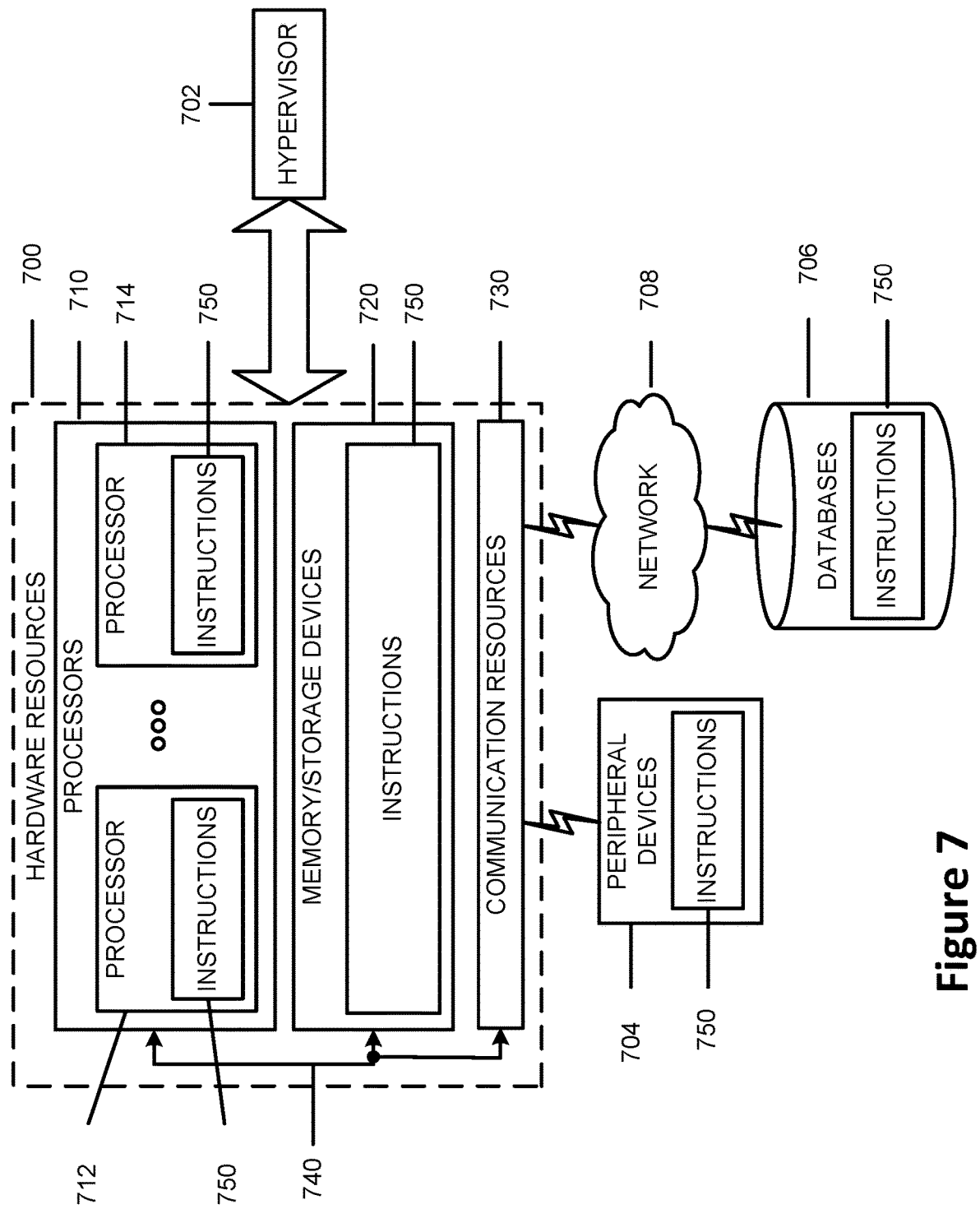
FIG. 7 illustrates hardware resources in accordance with various embodiments.

FIG. 7 is a block diagram illustrating components, according to some example embodiments, able to read instructions from a machine-readable or computer-readable medium (for example, a non-transitory machine-readable storage medium) and perform any one or more of the methodologies discussed herein. Specifically, FIG. 7 shows a diagrammatic representation of hardware resources 700 including one or more processors (or processor cores) 710, one or more memory/storage devices 720, and one or more communication resources 730, each of which may be communicatively coupled via a bus 740. For embodiments where node virtualization (for example, network function virtualization (NFV)) is utilized, a hypervisor 702 may be executed to provide an execution environment for one or more network slices/sub-slices to utilize the hardware resources 700.

The processors 710 (for example, a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 712 and a processor 714.

The memory/storage devices 720 may include main memory, disk storage, or any suitable combination thereof. The memory/storage devices 720 may include, but are not limited to, any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 730 may include interconnection or network interface components or other suitable devices to communicate with one or more peripheral devices 704 or one or more databases 706 via a network 708. For example, the communication resources 730 may include wired communication components (for example, for coupling via a Universal Serial Bus (USB)), cellular communication components, NFC components, Bluetooth® components (for example, Bluetooth® Low Energy), Wi-Fi® components, and other communication components.

Instructions 750 may comprise software, a program, an application, an applet, an app, or other executable code for causing at least any of the processors 710 to perform any one or more of the methodologies discussed herein, e.g., the operation flows 500 and 505. For example, in an embodiment in which the hardware resources 700 are implemented into the UE 105, the instructions 750 may cause the UE to perform some or all of the operation flow/algorithmic structure 500. In other embodiments, the hardware resources 700 may be implemented into the AN 110. The instructions 750 may cause the AN 110 to perform some or all of the operation flow/algorithmic structure 505. The instructions 750 may reside, completely or partially, within at least one of the processors 710 (for example, within the processor's cache memory), the memory/storage devices 720, or any suitable combination thereof. Furthermore, any portion of the instructions 750 may be transferred to the hardware resources 700 from any combination of the peripheral devices 704 or the databases 706. Accordingly, the memory of processors 710, the memory/storage devices 720, the peripheral devices 704, and the databases 706 are examples of computer-readable and machine-readable media.

Some non-limiting examples are as follows. The following examples pertain to further embodiments, and specifics in the examples may be used anywhere in one or more embodiments discussed previously. Any of the following examples may be combined with any other example or any embodiment discussed herein.

Example 1 may include one or more computer-readable media (CRM) comprising instructions to, upon execution of the instructions by one or more processors of a UE, cause the UE to decode a message to obtain a measurement gap (MG) configuration in an NR-related network; and determine, based on the MG configuration, a start of a configured MG that corresponds to one or more long term evolution (LTE) subframes and one or more new radio (NR) subframes (or slots) received by the UE.

Example 2 may include the one or more CRM of example 1 and/or some other example herein, wherein the NR-related network is an EN-DC network, and wherein the one or more long term evolution (LTE) subframes correspond to one or more MCG cells and the one or more new radio (NR) subframes (or slots) correspond to one or more SCG cells.

Example 3 may include the one or more CRM of example 2 and/or some other example herein, wherein MG configuration is to indicate that the configured MG starts at x milliseconds advanced to an end of a latest subframe occurring immediately before a subframe of the configured MG among the one or more LTE subframes of the one or more MCG serving cells, and the subframe of the configured MG is a subframe of the configured MG received by the UE at last in time among the one or more LTE subframes.

Example 4 may include the one or more CRM of examples 2-3 and/or some other example herein, wherein the MG configuration is to indicate a per-UE MG and the subframe of the configured MG is a subframe received last in time by the UE, among the one or more LTE subframes of the one or more MCG serving cells.

Example 5 may include the one or more NTCRM of examples 2-3 and/or some other example herein, wherein the MG configuration is to indicate a per-frequency range (FR) for frequency range 1 (FR1) MG and the subframe of the configured MG is a subframe received at last in time by the UE, among the one or more LTE subframes of the one or more MCG serving cells.

Example 6 may include the one or more CRM of example 2 and/or some other example herein, wherein the MG configuration is to indicate that the configured MG starts at x milliseconds advanced to an end of a latest subframe (or slot) occurring immediately before a subframe (or slot) of the configured MG among the one or more NR subframes (or slots) of the one or more SCG serving cells, and the subframe (or slot) of the configured MG is a subframe (or slot) of the configured MG received by the UE at last in time among the one or more NR subframes.

Example 7 may include the one or more NTCRM of examples 2 and 6, and/or some other example herein, wherein the MG configuration is to indicate a per-frequency range (FR) for frequency range 2 (FR2) MG and the subframe (or slot) of the configured MG is a subframe (or slot) received at last in time by the UE, among the one or more NR subframes.

Example 8 may include the one or more NTCRM of examples 1-7, and/or some other example herein, wherein, upon execution, the instructions are further to cause the UE to determine the subframe of the configured MG among the one or more LTE subframes of the one or more MCG serving cells, based on respective receiving times of the one or more LTE subframes by the UE.

Example 9 may include the one or more NTCRM of examples 1-7, and/or some other example herein, wherein, upon execution, the instructions are further to cause the UE to determine the subframe (or slot) of the configured MG among the one or more NR subframes (or slots) of the one or more SCG serving cells, based on respective receiving times of the one or more NR subframes (or slots) by the UE.

Example 10 may include the one or more NTCRM of examples 1-9, and/or some other example herein, wherein the MG configuration is to indicate an MG timing advance of x milliseconds to configure that the MG starts x milliseconds advanced to the end of the latest subframe occurring immediately before the subframe of the configured MG, and x is equal to or greater than zero.

Example 11 may include the one or more NTCRM of example 10, and/or some other example herein, wherein, upon execution, the instructions are further to cause the UE to determine the configured MG based on the MG configuration.

Example 12 may include the one or more NTCRM of example 11, and/or some other example herein, wherein, upon execution, the instructions are further to cause the UE to receive the message via a radio resource control (RRC) signaling.

Example 1i may include the one or more NTCRM of example 1, and/or some other example herein, wherein in EN-DC case, if per-UE MG is configured and MG timing advance=0 ms, this MG starts at the end of the latest LTE subframe occurring immediately before the measurement gap among MCG (master cell group) serving cells subframes.

Example 2i may include the one or more NTCRM of example 1, and/or some other example herein, wherein in EN-DC case, if per-UE MG is configured and MG timing advance=x ms, this MG starts at the time point which is x ms earlier than the end of the latest LTE subframe occurring immediately before the measurement gap among MCG (master cell group) serving cells subframes. For example, x=0.5.

Example 3i may include the one or more NTCRM of example 1, and/or some other example herein, wherein in EN-DC case, if per-FR MG for FR1 is configured and MG timing advance=0 ms, this per-FR MG for FR1 starts at the end of the latest LTE subframe occurring immediately before the measurement gap among MCG (master cell group) serving cells subframes in FR1.

Example 4i may include the one or more NTCRM of example 1, and/or some other example herein, wherein in EN-DC case, if per-FR MG for FR1 is configured and MG timing advance=x ms, this per-FR MG for FR1 starts at the time point which is x ms earlier than the end of the latest LTE subframe occurring immediately before the measurement gap among MCG (master cell group) serving cells subframes in FR1. For example, x=0.5.

Example 5i may include the one or more NTCRM of example 1, and/or some other example herein, wherein in EN-DC case, if per-FR MG for FR2 is configured and MG timing advance=0 ms, this per-FR MG for FR2 starts at the end of the latest NR slot occurring immediately before the measurement gap among serving cells slots in FR2.

Example 6i may include the one or more NTCRM of example 1, and/or some other example herein, wherein in EN-DC case, if per-FR MG for FR2 is configured and MG timing advance=x ms, this per-FR MG for FR2 starts at the time point which is x ms earlier than the end of the latest NR slot occurring immediately before the measurement gap among serving cells slots in FR2. For example, x=0.25.

Example 13 may include one or more computer-readable media (CRM) comprising instructions to, upon execution of the instructions by one or more processors of a UE, cause the UE to decode a message to obtain a measurement gap (MG) configuration in an NR-related network; and determine, based on the MG configuration, a start of a configured MG that corresponds to a first plurality of NR subframes or slots of one or more master-cell-group (MCG) serving cells and a second plurality of subframes or slots of one or more secondary-cell-group (SCG) serving cells received by the UE.

Example 14 may include the one or more CRM of example 13 and/or some other example herein, wherein the MG configuration is to indicate that the configured MG starts at x milliseconds advanced to an end of a latest NR subframe or slot occurring immediately before an NR subframe or slot of the configured MG among the first plurality of NR subframes or slots of the one or more MCG serving cells, and the NR subframe or slot is received by the UE at last in time among the first plurality of NR subframes or slots.

Example 15 may include the one or more CRM of example 14 and/or some other example herein, wherein the MG configuration is a per-UE MG configuration.

Example 16 may include the one or more CRM of example 14 and/or some other example herein, wherein the MG configuration is a per-FR MG configuration for FR1.

Example 17 may include the one or more CRM of example 13 and/or some other example herein, wherein the MG configuration is a per-FR MG configuration for FR2, and the MG configuration is to indicate that the configured MG starts at x milliseconds advanced to an end of a latest NR subframe or slot occurring immediately before an NR subframe or slot of the configured MG among the second plurality of NR subframes or slots of the one or more SCG serving cells, and the NR subframe or slot is received by the UE at last in time among the second plurality of NR subframes or slots.

Example 18 may include the one or more CRM of example 13 and/or some other example herein, wherein the NR-related network is an NR-NR DC network.

Example 7i may include the one or more CRM of example 13, and/or some other example herein, wherein in standalone case except NR-NR DC, if per-FR MG for FR1 is configured and MG timing advance=0 ms, this per-FR MG for FR1 starts at the end of the latest NR slot occurring immediately before the measurement gap among MCG (master cell group) serving cells slots in FR1 when at least one master cell is in FR1. In standalone case except NR-NR DC, if per-FR MG for FR1 is configured and MG timing advance=0 ms, this per-FR MG for FR1 starts at the end of the latest LTE subframeNR slot occurring immediately before the measurement gap among LTE NR serving cells subframes slots when all the master cells are in FR2.

Example 8i may include the one or more CRM of example 13, and/or some other example herein, wherein in standalone case except NR-NR DC, if per-FR MG for FR1 is configured and MG timing advance=x ms, this per-FR MG for FR1 starts at the time point which is x ms earlier than the end of the latest NR slot occurring immediately before the measurement gap among MCG (master cell group) serving cells slots when at least one master cell is in FR1. For example, x=0.5. In standalone case except NR-NR DC, if per-FR MG for FR1 is configured and MG timing advance=x ms, this per-FR MG for FR1 starts at the time point which is x ms earlier than the end of the latest LTE subframe NR slotoccurring immediately before the measurement gap among LTE NR serving cells subframes slots when all the master cells are in FR2. For example, x=0.5.

Example 9i may include the one or more CRM of example 13, and/or some other example herein, wherein in standalone case except NR-NR DC, if per-FR MG for FR2 is configured and MG timing advance=0 ms, this per-FR MG for FR2 starts at the end of the latest NR slot occurring immediately before the measurement gap among MCG (master cell group) serving cells slots in FR2 when at least one master cell is in FR2.

Example 10i may include the one or more CRM of example 13, and/or some other example herein, wherein in standalone case except NR-NR DC, if per-FR MG for FR2 is configured and MG timing advance=x ms, this per-FR MG for FR2 starts at the time point which is x ms earlier than the end of the latest NR slot occurring immediately before the measurement gap among MCG (master cell group) serving cells slots in FR2 when at least one master cell is in FR2. For example, x=0.25.

Example 11i may include the one or more CRM of example 13, and/or some other example herein, wherein in NR-NR DC, if per-FR MG for FR1 is configured and MG timing advance=0 ms, this per-FR MG for FR1 starts at the end of the latest NR slot occurring immediately before the measurement gap among MCG (master cell group) serving cells slots in FR1 when at least one master cell is in FR1. In NR-NR DC, if per-FR MG for FR1 is configured and MG timing advance=0 ms, this per-FR MG for FR1 starts at the end of the latest NR slot occurring immediately before the measurement gap among NR serving cells slots when all the master cells are in FR2.

Example 12i may include the one or more CRM of example 13, and/or some other example herein, wherein in NR-NR DC, if per-FR MG for FR1 is configured and MG timing advance=x ms, this per-FR MG for FR1 starts at the time point which is x ms earlier than the end of the latest NR slot occurring immediately before the measurement gap among MCG (master cell group) serving cells slots when at least one master cell is in FR1. For example, x=0.5. In NR-NR DC, if per-FR MG for FR1 is configured and MG timing advance=x ms, this per-FR MG for FR1 starts at the time point which is x ms earlier than the end of the latest NR slot occurring immediately before the measurement gap among NR serving cells slots when all the master cells are in FR2. For example, x=0.5.

Example 13i may include the one or more CRM of example 13, and/or some other example herein, wherein in NR-NR DC, if per-FR MG for FR2 is configured and MG timing advance=0 ms, this per-FR MG for FR2 starts at the end of the latest NR slot occurring immediately before the measurement gap among MCG (master cell group) serving cells slots in FR2 when at least one master cell is in FR2. In NR-NR DC, if per-FR MG for FR2 is configured and MG timing advance=0 ms, this per-FR MG for FR2 starts at the end of the latest NR slot occurring immediately before the measurement gap among NR serving cells slots when all the master cells are in FR1.

Example 14i may include the one or more CRM of example 13, and/or some other example herein, wherein in NR-NR DC, if per-FR MG for FR2 is configured and MG timing advance=x ms, this per-FR MG for FR2 starts at the time point which is x ms earlier than the end of the latest NR slot occurring immediately before the measurement gap among MCG (master cell group) serving cells slots when at least one master cell is in FR2. For example, x=0.25. In NR-NR DC, if per-FR MG for FR2 is configured and MG timing advance=x ms, this per-FR MG for FR2 starts at the time point which is x ms earlier than the end of the latest NR slot occurring immediately before the measurement gap among NR serving cells slots when all the master cells are in FR1. For example, x=0.25.

Example 19 may include one or more computer-readable media (CRM) comprising instructions to, upon execution of the instructions by one or more processors of an Access Node (AN), cause the AN to: generate a message to indicate a measurement gap (MG) configuration for a user equipment (UE), in a new radio (NR)-related operation; and transmit the message to the UE to configure the UE with an MG; and wherein the MG configuration is to indicate the configured MG starts at x milliseconds advanced to an end of a latest subframe among either a first set of subframes of one or more master-cell-group (MCG) serving cells or a second set of subframes of one or more secondary-cell-group (SCG) serving cells, and the latest subframe is received by the UE at last in time among either the first set of subframes or the second set of subframes.

Example 20 may include the one or more CRM of example 19 and/or some other example herein, wherein the AN is a next-generation NodeB (gNB) and the NR-related operation is an NR-NR DC, NR CA, or NR single carrier operation.

Example 21 may include the one or more CRM of example 19 and/or some other example herein, wherein the AN is evolved NodeB (eNB).

Example 22 may include the one or more CRM of example 19 and/or some other example herein, wherein to generate the message is to generate a radio resource control (RRC) information element (IE) to indicate the MG.

Example 23 may include the one or more CRM of example 22 and/or some other example herein, wherein to transmit the message is to transmit the RRC IE via an RRC signaling.

Example 24 may include the one or more CRM of examples 19-23 and/or some other example herein, wherein the MG is a per-UE MG and the MG configuration is to indicate the MG starts at x milliseconds advanced to an end of a latest subframe among the first set of subframes of the one or more MCG serving cells.

Example 25 may include the one or more CRM of examples 19-23 and/or some other example herein, wherein the MG is a per-frequency range (FR) MG for FR1 and the MG configuration is to indicate the MG starts at x milliseconds advanced to an end of a latest subframe among the first set of subframes of the one or more MCG serving cells operating in FR1.

Example 26 may include the one or more CRM of examples 19-23 and/or some other example herein, wherein the MG is a per-frequency range (FR) MG for FR2 and the MG configuration is to indicate the MG starts at x milliseconds advanced to an end of a latest subframe among the second set of subframes of the one or more SCG serving cells operating in FR2.

Example 27 may include one or more non-transitory computer-readable media comprising instructions to cause an electronic device, upon execution of the instructions by one or more processors of the electronic device, to perform one or more elements of a method or NTCRM described in or related to any of examples 1-26 and 1i-14i, or any other method or process described herein.

Example 28 may include an apparatus comprising logic, modules, and/or circuitry to perform one or more elements of a method or NTCRM described in or related to any of examples 1-26 and 1i-14i, or any other method or process described herein.

Example 29 may include a method, technique, or process as described in or related to any of examples 1-26 and 1i-14i, or portions or parts thereof.

Example 30 may include an apparatus comprising: one or more processors and one or more computer-readable media comprising instructions that, when executed by the one or more processors, cause the one or more processors to perform the method, techniques, or process as described in or related to any of examples 1-26 and 1i-14i, or portions thereof, or otherwise described in the present disclosure. The one or more computer-readable media may be one transitory or non-transitory computer-readable media.

Example 31 includes at least one transitory or non-transitory computer-readable storage medium comprising data, wherein the data is to create, manufacture, or otherwise produce instructions, wherein execution of the instructions is to cause a computing device or computing system to perform the method, techniques, or process as described in or related to any of examples 1-26 and 1i-14i, or portions thereof, or otherwise described in the present disclosure.

Example 32 includes a signal as described in or related to any of examples 1-26 and 1i-14i, or portions or parts thereof, or otherwise described in the present disclosure.

Example 33 includes a signal in a wireless network as shown and described in the present disclosure, or otherwise described in the present disclosure.

Example 34 includes a method of communicating in a wireless network as shown and described in the present disclosure.

Example 35 includes a system for providing wireless communication as shown and described in the present disclosure.

Example 36 includes a device for providing wireless communication as shown and described in the present disclosure.

Example 37 includes a packet, frame, segment, protocol data unit (PDU), or message as described in or related to any of examples 1-26 and 1i-14i, or portions or parts thereof, or otherwise described in the present disclosure.

The present disclosure is described with reference to flowchart illustrations or block diagrams of methods, apparatuses (systems) and computer program products according to embodiments of the disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means that implement the function/act specified in the flowchart or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide processes for implementing the functions/acts specified in the flowchart or block diagram block or blocks.

The description herein of illustrated implementations, including what is described in the Abstract, is not intended to be exhaustive or to limit the present disclosure to the precise forms disclosed. While specific implementations and examples are described herein for illustrative purposes, a variety of alternate or equivalent embodiments or implementations calculated to achieve the same purposes may be made in light of the above detailed description, without departing from the scope of the present disclosure, as those skilled in the relevant art will recognize.

What is claimed is:

1. One or more non-transitory computer-readable media (CRM) comprising instructions to, upon execution of the instructions by one or more processors of a user equipment (UE), cause the UE to:
    decode a message to obtain a measurement gap (MG) configuration in an evolved universal terrestrial radio access—new radio dual connectivity (EN-DC) operation; and
    determine, based on the MG configuration, a start of a configured MG that corresponds to one or more long term evolution (LTE) subframes of one or more master-cell-group (MCG) serving cells and one or more new radio (NR) subframes of one or more secondary-cell-group (SCG) serving cells received by the UE; and
    wherein the MG configuration is to indicate that the configured MG starts at x milliseconds advanced to an end of a latest subframe occurring immediately before a subframe of the configured MG among the one or more NR subframes of the one or more SCG serving cells including a primary secondary serving cell (PSCell), x is a value greater than zero, and the subframe of the configured MG is a subframe of the configured MG received by the UE at last in time among the one or more LTE subframes or among the one or more NR subframes.

2. The one or more non-transitory CRM of claim 1, wherein the MG configuration is to indicate a per-UE MG and the subframe of the configured MG is a subframe received last in time by the UE, among the one or more LTE subframes of the one or more MCG serving cells.

3. The one or more non-transitory CRM of claim 1, wherein the MG configuration is to indicate a per-frequency range (FR) for frequency range 1 (FR1) MG and the subframe of the configured MG is a subframe received at last in time by the UE, among the one or more LTE sub frames of the one or more MCG serving cells.

4. The one or more non-transitory CRM of claim 1, wherein, upon execution, the instructions are further to cause the UE to determine the subframe of the configured MG among the one or more LTE subframes of the one or more MCG serving cells, based on respective receiving times of the one or more LTE subframes by the UE.

5. The one or more non-transitory CRM of claim 1, wherein the MG configuration is to indicate a per-frequency range (FR) for frequency range 2 (FR2) MG and the subframe of the configured MG is a subframe received last in time by the UE, among the one or more NR subframes of the one or more SCG serving cells.

6. The one or more non-transitory CRM of claim 1, wherein the MG configuration is to indicate an MG timing advance of x milliseconds to configure that the MG starts x milliseconds advanced to the end of the latest subframe occurring immediately before the subframe of the configured MG, and x is equal to or greater than zero.

7. The one or more non-transitory CRM of claim 1, wherein, upon execution, the instructions are further to cause the UE to determine the configured MG based on the MG configuration.

8. The one or more non-transitory CRM of claim 1, wherein, upon execution, the instructions are further to cause the UE to receive the message via a radio resource control (RRC) signaling.

9. One or more non-transitory computer-readable media (CRM) comprising instructions to, upon execution of the instructions by one or more processors of a user equipment (UE), cause the UE to:
    decode a message to obtain a per-frequency range (FR) measurement gap (MG) configuration for FR2 in an evolved universal terrestrial radio access-new radio dual connectivity (EN-DC) mode or a new radio (NR)-NR dual connectivity mode; and determine, based on the MG configuration, a start of a configured per-FR MG for FR2 that corresponds to a first plurality of subframes of one or more master-cell-group (MCG) serving cells and a second plurality of subframes of one or more secondary-cell-group (SCG) serving cells received by the UE; and
    wherein,
    the per-FR MG configuration for FR2 is to indicate that the configured per-FR MG for FR2 starts at x milliseconds advanced to an end of a latest NR slot occurring immediately before an NR slot of the configured per-FR MG for FR2 among one or more NR slots of the one or more SCG serving cells at FR2 including a primary secondary serving cell (PSCell), x is a value greater than zero, and the NR slot of configured per-FR MG for FR2 is received by the UE at last in time among the one or more NR slots of the one or more SCG serving cells at FR2.

10. The one or more non-transitory CRM of claim 9, wherein the per-FR MG configuration for FR2 is in the EN-DC mode, and the first plurality of subframes are long term evolution (LTE) subframes.

11. The one or more non-transitory CRM of claim 9, wherein the per-FR MG configuration for FR2 is in the NR-NR DC mode, and the first plurality of subframes are NR subframes operating at FR1.

12. The one or more non-transitory CRM of claim 9, wherein, upon execution, the instructions further to cause the UE to determine the latest NR slot among the second plurality of subframes of the one or more SCG serving cells, based on respective receiving times at the UE, with respect to NR slots of the second plurality of subframes.

13. A user equipment (UE), comprising:
    one or more baseband processors to decode a message to obtain a measurement gap (MG) configuration, in a new radio (NR)-related operation; and
    a central processing unit (CPU) coupled with the one or more baseband processors, the CPU to determine, based on the decoded MG configuration, a start of a configured MG that corresponds to a first set of NR slots of one or more master-cell-group (MCG) serving cells and a second set of NR slots of one or more secondary-cell-group (SCG) serving cells including a primary secondary serving cell (PSCell) received by the UE; and
    wherein the MG configuration is to indicate that the configured MG starts at x milliseconds advanced to an end of a latest NR slot occurring immediately before the configured MG among the first set of NR slots of the one or more MCG serving cells and among the second set of NR slots of the one or more SCG serving cells including the PSCell, x is a value greater than zero, and the latest NR slot is determined based on respective receiving times of the first set of NR slots at the UE.

14. The UE of claim 13, wherein the MG configuration is to indicate a per-UE MG.

15. The UE of claim 13, wherein the MG configuration is to indicate a per-frequency range (FR) MG for FR1, and the first set of NR slots of the one or more MCG serving cells operates in FR1.

16. The UE of claim 13, wherein the CPU is further to determine the latest NR slot based on the respective receiving times of the first set of NR slots by the UE, further wherein the latest NR slot is a last NR slot received by the UE among the first set of NR slots.

17. The UE of claim 13, wherein the MG configuration is indicated by an information element (IE) of NR radio resource control (RRC).

18. The UE of claim 13, wherein the one or more baseband processors are further to operate based on the determined start of the MG.

19. The UE of claim 13, wherein the NR-related operation is an NR-NR dual connectivity (DC) operation.

* * * * *